(12) United States Patent
Kim et al.

(10) Patent No.: US 11,550,185 B2
(45) Date of Patent: Jan. 10, 2023

(54) OPTICAL FILM AND BACKLIGHT UNIT INCLUDING THE SAME

(71) Applicant: LMS Co., Ltd., Pyeongtaek-si (KR)

(72) Inventors: Jinhwan Kim, Pyeongtaek-si (KR); Sungsik Cho, Pyeongtaek-si (KR); Woojong Lee, Pyeongtaek-si (KR); Changgoo Park, Pyeongtaek-si (KR)

(73) Assignee: LMS CO., LTD., Pyeongtaek-si (KR)

( * ) Notice: Subject to any disclaimer, the term of this patent is extended or adjusted under 35 U.S.C. 154(b) by 0 days.

(21) Appl. No.: 17/509,133

(22) Filed: Oct. 25, 2021

(65) Prior Publication Data

US 2022/0146882 A1    May 12, 2022

(30) Foreign Application Priority Data

Nov. 6, 2020    (KR) .................. 10-2020-0147831

(51) Int. Cl.
*G02F 1/1335*    (2006.01)
*F21V 8/00*    (2006.01)

(52) U.S. Cl.
CPC ..... *G02F 1/133607* (2021.01); *G02B 6/0025* (2013.01)

(58) Field of Classification Search
CPC .. G02B 6/0036; G02B 6/0038; G02B 6/0041; G02B 6/005; G02B 6/0053
See application file for complete search history.

(56) References Cited

U.S. PATENT DOCUMENTS

| | | | |
|---|---|---|---|
| 2009/0079905 A1* | 3/2009 | Kimura | G02F 1/133606 349/62 |
| 2016/0054507 A1* | 2/2016 | Hirayama | G02B 6/0091 362/607 |
| 2016/0341882 A1 | 11/2016 | Cho et al. | |
| 2021/0116629 A1* | 4/2021 | Sun | G02F 1/133308 |

FOREIGN PATENT DOCUMENTS

| | | |
|---|---|---|
| CN | 205720744 | * 11/2016 |
| KR | 10-2007-0010408 A | 1/2007 |
| KR | 10-1257335 B | 4/2013 |
| KR | 10-2014-0079681 A | 6/2014 |
| KR | 10-2014-0085357 A | 7/2014 |
| KR | 10-2015-0083699 A | 7/2015 |
| KR | 10-2017-0064377 A | 6/2017 |
| TW | 202043882 A | 12/2020 |

OTHER PUBLICATIONS

Korean Office Action dated Apr. 26, 2022 issued in Patent Application No. 10-2020-0147831 (7 pages).
Taiwanese Office Action dated Aug. 31. 2022 issued in Patent Application No. 110139213 w/English Translation (8 pages).

* cited by examiner

Primary Examiner — Julie A Bannan
(74) Attorney, Agent, or Firm — Polsinelli PC

(57) ABSTRACT

A backlight unit according to various embodiments of the disclosure may include a light source, a light guide plate configured to guide light emitted from the light source and disposed to face in a first direction, and an optical film disposed over the light guide plate. The optical film may include a first prism sheet including first prism structures arranged side by side to each other along a second direction perpendicular to the first direction, and a second prism sheet disposed over the first prism sheet and including second prism structures arranged side by side to each other along a (Continued)

third direction forming an acute angle with the second direction.

14 Claims, 7 Drawing Sheets

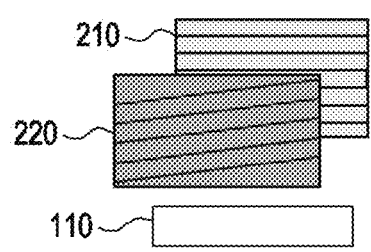 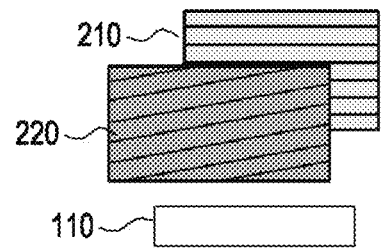
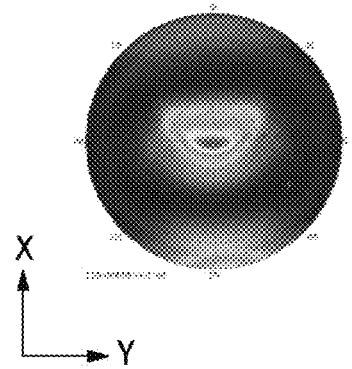 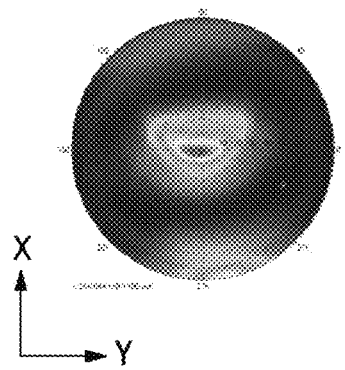
FIG.8A  FIG.8B
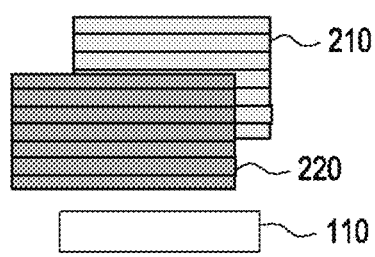 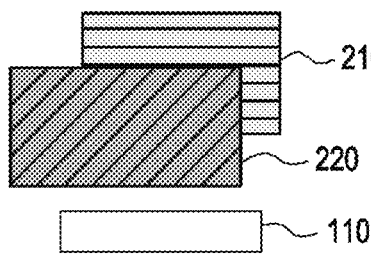 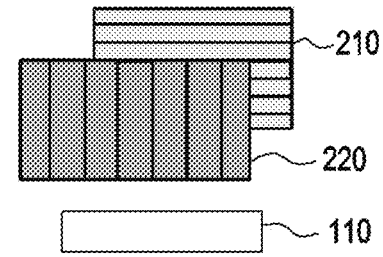
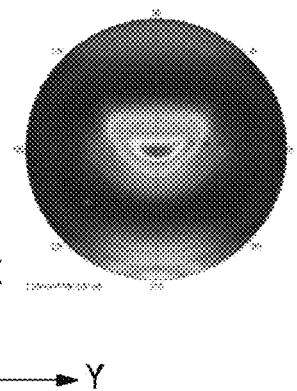 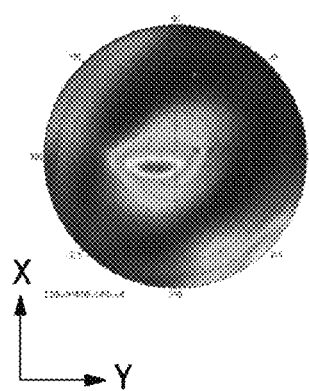 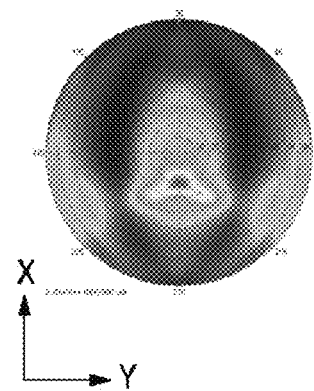
FIG.8C  FIG.8D  FIG.8E

OPTICAL FILM AND BACKLIGHT UNIT INCLUDING THE SAME

CROSS-REFERENCE TO RELATED APPLICATION(S)

This application is based on and claims priority under 35 U.S.C. 119 to Korean Patent Application No. 10-2020-0147831, filed on Nov. 6, 2020, in the Korean Intellectual Property Office, the disclosure of which is herein incorporated by reference in its entirety.

TECHNICAL FIELD

Various embodiments of the disclosure relate to an optical film and a backlight unit including the same.

BACKGROUND

In general, a liquid crystal display (LCD) may include a backlight unit configured to evenly emit light across the entire screen of an electronic device. the backlight unit may include a light source, a light guide plate, a diffusion sheet, and an optical film. Light emitted from the light source may be transferred to the upper portion through the light guide plate, and the light transferred to the upper portion may be diffused through the diffusion sheet and then transferred to the liquid crystal panel through the optical film provided on the upper portion. In some cases, the backlight unit may further include an additional diffusion sheet on the upper portion of the optical film. A conventional optical film may have multiple diffusion and light-collecting sheets laminated such that the point light source of the light source is changed to a surface light surface.

Recently developed display panels tend to become thinner, and backlights thus need to be manufactured flat. There has been ongoing development for removing the diffusion sheet, which has a relatively large thickness, from the backlight unit. However, if the diffusion sheet is removed simply to reduce the thickness of the backlight unit, resulting irregular luminance may pose a problem of reliability, and insufficient diffusion may pose a problem of narrow field of views. Accordingly, there is a need to develop a structure capable of sufficiently compensating for the luminance and the field of view while guaranteeing a flat backlight unit.

SUMMARY

There has been ongoing development for removing the diffusion sheet, which has a relatively large thickness, from the backlight unit. However, if the diffusion sheet is removed simply to reduce the thickness of the backlight unit, resulting irregular luminance may pose a problem of reliability, and insufficient diffusion may pose a problem of narrow field of views. Accordingly, there is a need to develop a structure capable of sufficiently compensating for the luminance and the field of view while guaranteeing a flat backlight unit.

According to various embodiments of the disclosure, the diffusion sheet between the light guide plate and the diffusion film may be excluded, and a diffusion film including multiple laminated prism sheets may be implemented, thereby providing a slim backlight unit, improved luminance, and a secured field of view.

A backlight unit according to various embodiments of the disclosure may include a light source, a light guide plate configured to guide light emitted from the light source and disposed to face in a first direction, and an optical film disposed over the light guide plate. The optical film may include a first prism sheet including first prism structures arranged side by side to each other along a second direction perpendicular to the first direction, and a second prism sheet disposed over the first prism sheet and including second prism structures arranged side by side to each other along a third direction forming an acute angle with the second direction.

An optical film and a backlight unit including the same, according to various embodiments of the disclosure, are advantageous in that an optical film having a first prism sheet and a second prism sheet laminated on each other may be provided, and the first prism structure of the first prism sheet and the second prism structure of the second prism sheet may have different arrangements, thereby improving luminance.

An optical film and a backlight unit including the same, according to various embodiments of the disclosure, are advantageous in that an optical film having a first prism sheet and a second prism sheet laminated on each other may be provided, and the diffusion sheet between the light guide plate and the optical film may be excluded, thereby implementing slimness of the optical film and/or the backlight unit.

An optical film and a backlight unit including the same, according to various embodiments of the disclosure, are advantageous in that an optical film having a first prism sheet and a second prism sheet laminated on each other may be provided, and the first prism sheet or the second prism sheet may have a prism structure manufactured in the shape of an asymmetric triangular column, thereby improving concentration of light directed to the liquid crystal panel.

Advantageous effects obtainable from the disclosure are not limited to the above-mentioned advantageous effects, and other advantageous effects not mentioned herein will be clearly understood by those skilled in the art to which the disclosure pertains.

BRIEF DESCRIPTION OF THE DRAWINGS

The below and other aspects, features, and advantages of the disclosure will be more apparent from the following detailed description taken in conjunction with the accompanying drawings, in which:

FIG. 8A to FIG. 8E illustrate angle distributions in connection with luminance according to the degree of tilting between a first prism sheet and a second prism sheet according to various embodiments of the disclosure with regard to experiment cases, respectively.

DETAILED DESCRIPTION

It should be understood that the various embodiments of the disclosure and the terminology used herein are not intended to limit the techniques described herein to specific embodiments but to include various modifications, equivalents, or alternatives thereof. In connection with the explanation of the drawings, the similar reference symbols may be used to refer to similar or related components. In the description, the singular forms "a", "an", and" the" of a noun corresponding to an item may be intended to include the plural forms as well, unless the context clearly indicates otherwise.

According to various embodiments, each component (e.g., a module or a program) of the components described below may contain a single unit or multiple units and some of the multiple units may be arranged separately in different components. According to various embodiment, one or more of the components or the operations described below may be omitted or one or more other components or operations may be added. Alternatively or additionally, a plurality of components (e.g., modules or programs) may be integrated into a single component. In such a case, the integrated component may continue to perform one or more functions of each of the plurality of components in the same or a similar manner as performed by a corresponding one of the plurality of components prior to integration. According to various embodiments, operations executed by a module, program, or another component may be carried out in sequence, in parallel, by repetition, or heuristically. Some operations may be executed in a different order or may be omitted, and one or more new operations may be added thereto.

Embodiments will be described with reference to the accompanying drawings. In connection with the explanation of the embodiments, the same names or reference symbols may be used to refer to the same configurations, and additional explanations may be omitted. In connection with the explanation of the embodiments, it should be noted that the same names and reference symbols are used to components having the same functions, but substantially, the components are not identical thereto.

According to various embodiments, It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Figure 1:
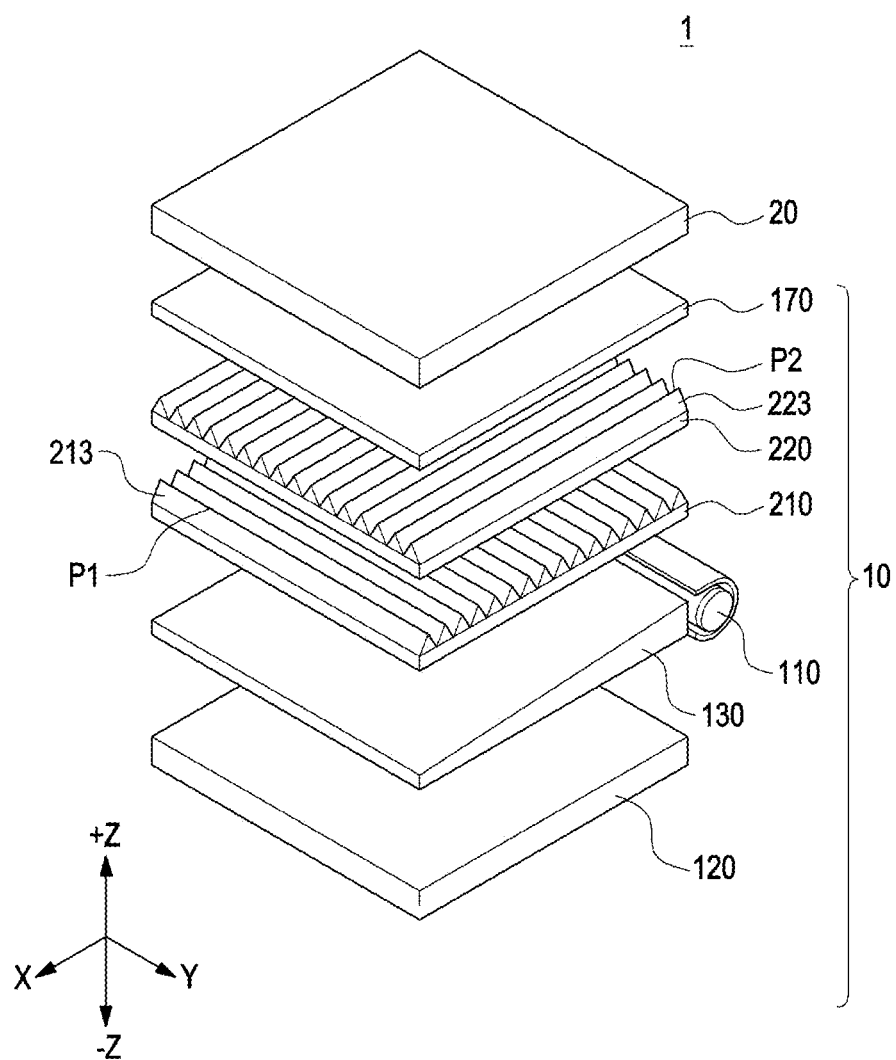
FIG. 1 is an exploded perspective view of a liquid crystal display device according to various embodiments of the disclosure.

FIG. 1 is an exploded perspective view of a liquid crystal display device 1 according to various embodiments of the disclosure.

Figure 2:
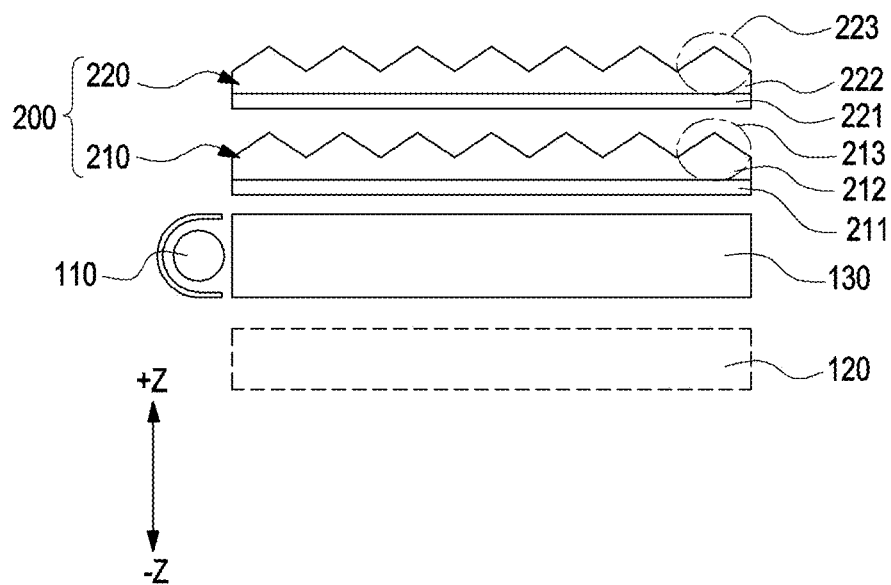
FIG. 2 is a cross-sectional view illustrating a part of a backlight unit according to an embodiment of the disclosure.
Figure 3:
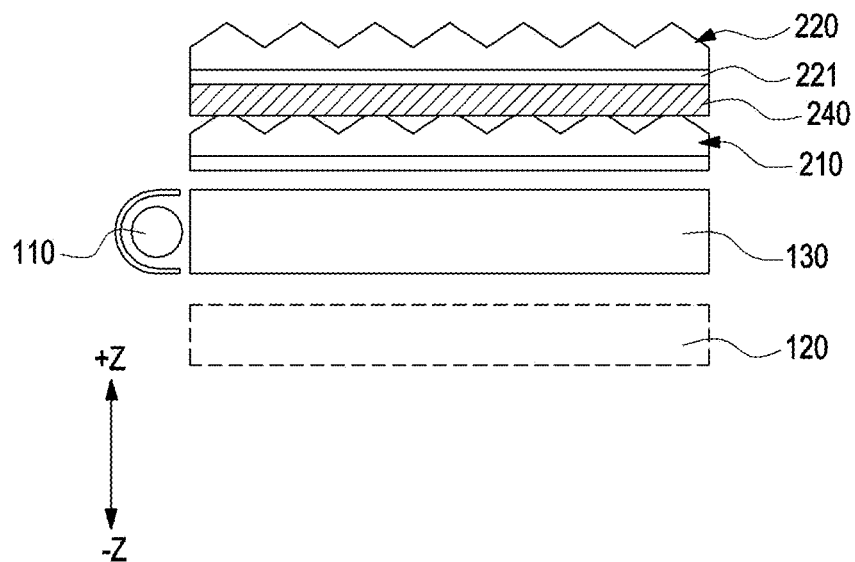
FIG. 3 is a cross-sectional view illustrating a part of a backlight unit according to another embodiment of the disclosure.
Figure 4:
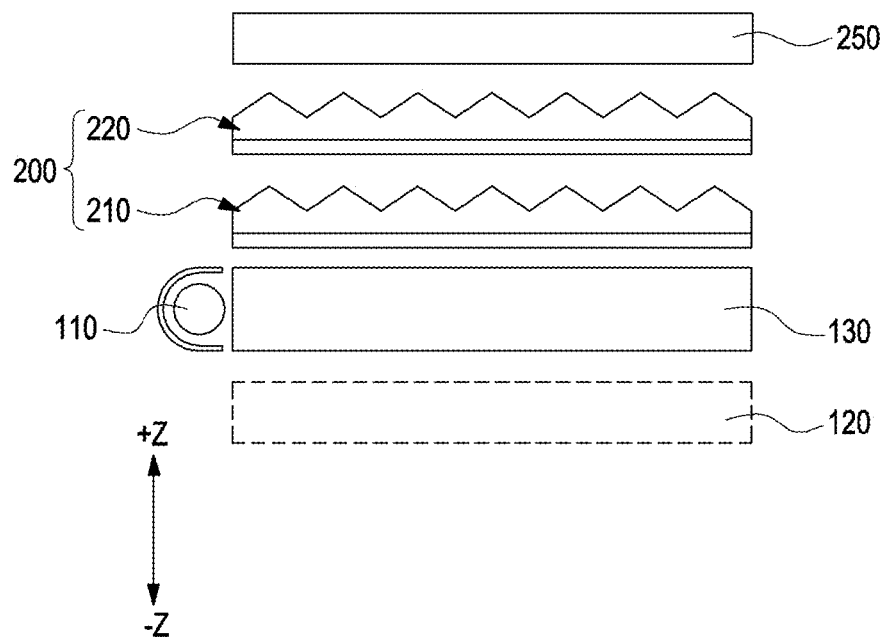
FIG. 4 is a cross-sectional view illustrating a part of a backlight unit according to another embodiment of the disclosure.

FIG. 2 is a cross-sectional view illustrating a part of a backlight unit 10 according to an embodiment of the disclosure. FIG. 3 is a cross-sectional view illustrating a part of a backlight unit 10 according to another embodiment of the disclosure. FIG. 4 is a cross-sectional view illustrating a part of a backlight unit 10 according to another embodiment of the disclosure.

Referring to FIG. 1, a liquid crystal display device 1 (or a liquid crystal display (LCD) device) may include a backlight unit 10 and a liquid crystal panel 20. According to various embodiments, the backlight unit 10 may be disposed toward a rear surface (a surface facing in the −Z axis direction) of the liquid crystal panel 20 so as to emit light to the liquid crystal panel 20. The backlight unit 10 may include a light source 110, a reflecting plate 120, a light guide plate 130, prism sheets 210 and 220, and/or a protective sheet 170.

According to various embodiments, light emitted from the light source 110 may be converted into a form of a surface light source by the light guide plate 130. The light source 110 may be an edge type or a direct type. According to one embodiment, the light source 110 may be configured to use a light-emitting diode (LED), a fluorescent lamp, or the like.

According to various embodiments, the reflecting plate 120 may be disposed toward a rear surface (a surface facing in the −Z axis direction) of the light guide plate 130. The reflecting plate 120 may be configured to reflect light emitted toward the rear surface of the light guide plate 130 toward the light guide plate 130 such that light is incident to the light guide plate 130, and enables the minimization of light loss.

According to various embodiments, the prism sheets 210 and 220 may be configured to collect light incident using an optical pattern formed on surfaces and then to emit the collected light to the liquid crystal panel 20. The prism sheets 210 and 220 each may include a base film having a light-transmitting property and an optical pattern layer formed on an upper surface (a surface facing in the +Z axis direction) of the base film. The optical pattern layer, in order for luminance improvement of a surface direction thereof, may be configured to be a pattern of a triangle array shape which has an inclined surface having a designated angle formed thereon.

According to various embodiments, the protective sheet 170 may be provided on an upper surface (a surface facing in the +Z axis direction) of the prism sheets 210 and 220 to protect the optical pattern layers of the prism sheets 210 and 220, and may be configured to deliver light collected from the prism sheets 210 and 220 to the liquid crystal panel 20.

According to various embodiments, the liquid crystal panel 20 may be configured to refract light emitted from the light source 110 into a predetermined pattern according to an electrical signal. The refracted light may be configured to pass through a color filter and a polarizing filter arranged on a front surface of the liquid crystal panel 20 to form a screen image.

Referring to FIG. 2 to FIG. 4, a backlight unit 10 according to an embodiment may include a light source 110, a reflecting plate 120, a light guide plate 130, and an optical film 200. According to one embodiment, the optical film 200 may include prism sheets 210 and 220. According to another embodiment, the optical film 200 may include prism sheets 210 and 220 and a diffusion sheet 250. The backlight unit 10 of FIG. 2 to FIG. 4 may have partially or entirely the same structure as the structure of the backlight unit 10 of FIG. 1.

Referring to FIG. 1 to FIG. 2, the optical film 200 may be stacked and disposed over the light guide plate 130, and the optical film 200 may include a first prism sheet 210 and a second prism sheet 220. The optical film 200 may have the first prism sheet 210 and the second prism sheet 220 which are sequentially stacked over the light guide plate 130.

According to various embodiments, the first prism sheet 210 may include a first base film 211 having a light-transmitting property and a first prism pattern layer 212 formed on a surface (an upper surface) of the first base film 211, which faces in a first direction (the +Z axis direction). The second prism sheet 220 may include a second base film 221 having a light-transmitting property and a second prism pattern layer 222 formed on a surface (an upper surface) of the second base film 221, which faces in the first direction (the +Z axis direction).

According to various embodiments, in the first prism pattern layer 212, multiple first prism structures 213 may be arranged side by side to each other. According to one embodiment, each of the first prism structures 213 may have a structure which extends in a second direction (the Y axis direction) perpendicular to the first direction (the +Z axis direction). For example, a vertex line P1 of each of the first prism structures 213 may be formed to extend in the second direction (the Y axis direction). According to an embodiment, one the first prism structure 213 may have a triangular column shape and to have a base side which is a rectangular shape and is disposed to face the first base film 211.

According to various embodiments, in the second prism pattern layer 222, multiple second prism structures 223 may be arranged side by side to each other. According to one embodiment, each of the second prism structures 223 may have a structure which extends in a third direction forming an acute angle with the second direction (the Y axis direction). A vertex line P2 of each of the second prism structures 223 may extend and be formed such that the vertex line P2 is not parallel to and is tilted to the second direction (Y axis direction). For example, the vertex lines P2 of the second prism structures 223 may be positioned while tilted by a designated angle with reference to the vertex lines P1 of the first prism structures 213. The designated angle may be within about +15 degrees or −15 degrees.

According to an embodiment, one the second prism structure 223 may have a triangular column shape and to have a base side which is a rectangular shape and is arranged to face the second base film 221.

According to an embodiment according to the disclosure, the first prism sheet 210 and the second prism sheet 220 may be configured to collect light which is emitted from the light source 110, guided by the light guide plate 130, and then delivered thereto. According that a diffusion sheet positioned between the light guide plate 130 and an optical film is removed, the structure of the optical film 200, which includes prism patterns having different directions to each other, may be configured to provide the optical film 200 and/or the backlight unit 10 which is slimmed as much as the thickness (e.g., 50-150 μm) of the diffusion sheet.

Referring to FIG. 3, an optical film 200 may be stacked and disposed over a light guide plate 130, and the optical film 200 may include a first prism sheet 210, an adhesive layer 240, and a second prism sheet 220. The optical film 200 may have the first prism sheet 210, the adhesive layer 240, and the second prism sheet 220 which are sequentially stacked over the light guide plate 130.

The first prism sheet 210 and the second prism sheet 220 of FIG. 3 may have partially or entirely the same structure as the structure of the first prism sheet 210 and the second prism sheet 220 of FIG. 2.

According to various embodiments, the first prism sheet 210 and the second prism sheet 220 may be bonded to each other by the adhesive layer 240. For example, the adhesive layer 240 may include a pressure sensitive adhesive (PSA), and the PSA may be applied onto a surface (an upper surface) of the first prism sheet 210, which faces in a first direction (the +Z axis direction) or a surface (a lower surface) of the second prism sheet 220, which faces in the −Z axis direction. Accordingly, the optical film 200 may be configured to form a composite sheet in which the first prism sheet 210 and the second prism sheet 220 are integrated by the adhesive layer 240.

Referring to FIG. 4, an optical film 200 may be stacked and disposed over a light guide plate 130, and the optical film 200 may include a first prism sheet 210, a second prism sheet 220, and a diffusion sheet 250. The optical film 200 may have the first prism sheet 210, the second prism sheet 220, and the diffusion sheet 250 which are sequentially stacked over the light guide plate 130. According to one embodiment, an adhesive layer (not shown) may be disposed between the first prism sheet 210 and the second prism sheet 220 so that the first prism sheet 210 and the second prism sheet 220 are integrated.

The first prism sheet 210 and the second prism sheet 220 of FIG. 4 may have partially or entirely the same structure as the structure of the first prism sheet 210 and the second prism sheet of FIG. 2.

According to various embodiments, the diffusion sheet 250 may be configured to uniformly diffuse light which is emitted from the light source 110, guided by the light guide plate 130, and then collected by the first prism sheet 210 and the second prism sheet 220. The diffusion sheet 250 may be produced by applying a curable resin (e.g., a single material or a compound obtained by a selection from at least one among urethane acrylate, epoxy acrylate, ester acrylate, and radical-generating monomer) solution to which a light diffusion agent (beeds) is added. The diffusion sheet 250 may be configured to cause light diffusion by the light diffusion agent (beeds). According to one embodiment, the diffusion sheet 250 may have a protrusion pattern (a protruding part) having a uniform or non-uniform shape (e.g., a spherical shape) in a size formed thereon so as to promote light diffusion.

According to various embodiments, the diffusion sheet 250 may be bonded to the second prism sheet 220 by an adhesive layer (not shown). For example, the adhesive layer may include a pressure sensitive adhesive (PSA). Accordingly, the optical film 200 may be configured to form a composite sheet in which the first prism sheet 210, the second prism sheet 220, and the diffusion sheet 250 are integrated by the adhesive layer.

Figure 5:
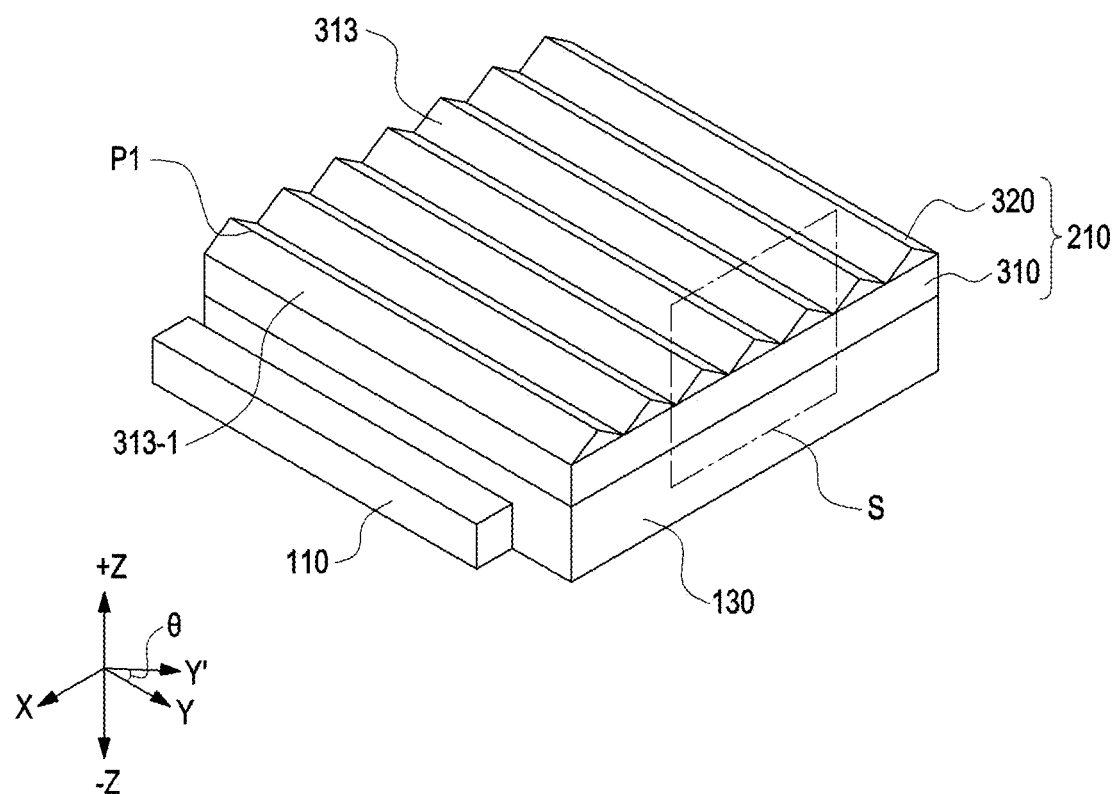
FIG. 5 is a perspective view of a first prism sheet of an optical film according to various embodiments of the disclosure.
Figure 6:
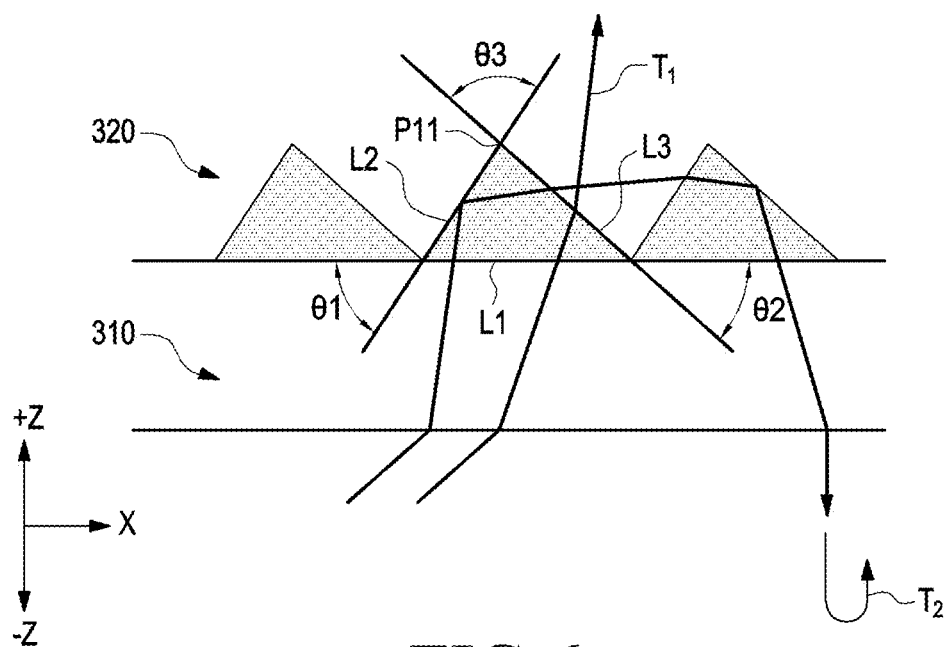
FIG. 6 is an enlarged cross-sectional view of an area of a first prism sheet of FIG. 5.

FIG. 5 is a perspective view of a first prism sheet 210 of an optical film 200 according to various embodiments of the disclosure. FIG. 6 is an enlarged cross-sectional view of an area S of a first prism sheet 210 of FIG. 5.

An optical film 200 according to various embodiments may include a first prism sheet 210 and a second prism sheet (e.g., the second prism sheet 220 of FIG. 1 to FIG. 4). Referring to FIG. 5 and FIG. 6, the first prism sheet 210 may have partially or entirely the same structure as the structure of the first prism sheet 210 FIG. 2 to FIG. 4.

According to various embodiments, the first prism sheet 210 may include a first base film 310 and a first prism pattern layer 320 formed on a surface (an upper surface) of the first base film 310, which faces in a first direction (the +Z axis direction). The first base film 310 may be made of transparent polyethylene terephthalate (PET), and the first prism pattern layer 320 may be made of ultraviolet (UV) resin. The first base film 310 may have a plate shape, and the first prism pattern layer 320 may have a structure in which multiple prism structures 313 are arranged along one direction.

According to various embodiments, each of the prism structures 313 may have the same triangular column shape.

According to various embodiments, one prism structure 313 may have an asymmetric triangular structure when seen from a cross section. Referring to FIG. 6, in one prism structure 313, the length of one surface opposite to (or in contact with) the first base film 310 may be defined as a first side L1, the length of one surface which forms a designated first angle θ1 with the first side L1 and is inclined may be defined as a second side L2, and the length of one surface which forms a designated second angle θ2 with the first side L1 and is inclined may be defined as a third side L3. The angle which is formed by the second side L2 and the third side L3 may be defined as a third angle θ3. According to an embodiment, the light source 110 may be configured to be close to the second side L2 of a prism structure 313-1 which is disposed at the edge, among multiple prism structures 313.

In the illustrated embodiment, with reference to the definition, the first side L1, the second side L2, and the third side L3 may have different lengths from each other. Among the first side L1, the second side L2, and the third side L3, the first side L1 may have the longest length, for example the length of about 40-50 μm. For another example, the first side L1 may have the length of about 46 μm. However, the length of each of the sides is not limited by the illustrated embodiment, and can be variously changed through a design change in order for a prism structure capable of efficiently collecting light.

According to an embodiment, the first angle θ1, the second angle θ2, and the third angle θ3 may have different angles form each other. For example, the first angle θ1, the second angle θ2, and the third angle θ3 may have an acute angle less than 90 degrees. According to one embodiment, among the first angle θ1, the second angle θ2, and the third angle θ3, the third angle θ3 may have the largest value. For example, the third angle θ3 may be about 80 degrees, the first angle θ1 may be about 55 degrees, and the second angle θ2 may be about 45 degrees. In the illustrated embodiment, a surface including the second side L2 formed by the first angle θ1 of each of the prism structures 313 may be configured to be a light reflection surface or a light refraction surface formed to refract light (incident light) delivered through the light guide plate 130 toward the third side L3. A surface including the third side L3 formed by the second angle θ2 of each of the prism structures 313 may be configured to be a light-emitting surface which collects light delivered through the light guide plate 130 and emits the collected light to the second prism sheet 220. For example, the light T1 which is not totally reflected by the prism structures 313 may travel toward a liquid crystal panel (e.g., the liquid crystal panel 20 of FIG. 1)(or the second prism sheet 220 of FIG. 1). For another example, the light T2 which is totally reflected may pass through the light guide plate 130 again, and after being reflected therefrom, may be again incident to the first prism sheet 210.

According to an embodiment, according that the second angle θ2 of each of the prism structures 313 is adjusted through a design, a light-emitting surface toward a liquid crystal panel is controlled, and thus a light direction may be changed to face toward the liquid crystal panel 20 (or the second prism sheet 220) without a separate diffusion sheet. Accordingly, the optical film 200 for high luminance can be implemented.

According to an embodiment, the vertex lines P1 of the prism structures 313 may be configured to extend in a direction parallel to a length direction of the light source 110. For example, the light source 110 may be configured to be a structure extending and disposed along the Y axis direction, and to deliver light toward the light guide plate 130. The vertex line P1 of each of the first prism structures 313 may be configured to extend along the Y axis direction. According to one embodiment, the height of each of the prism structures 313, in other words, the distance between the first side L1 and a vertex P11 of the vertex line P1, may be configured to be smaller than the length of the first side L1. For another example, the distance between the first side L1 and the vertex P11 may be configured to be greater than the half of the length of the first side L1. The height of each of the prism structures 313 may be about 20-30 μm, and for another example, may be about 27 μm.

According to another embodiment, the vertex lines P1 of the prism structures 313 may not be formed to be a direction parallel to the light source 101, and may be arranged to be tilted on the same surface as an arrangement direction of the light source 110. For example, the light source 110 may be a structure extending and disposed along the Y axis direction, and may be configured to deliver light to the X axis direction toward the light guide plate 130. The vertex lines P1 of the prism structures 313 may be arranged in a row while facing the light source 110, and may be configured to be tilted by a designated angle θ along the X axis direction with reference to the Y axis direction and extend. For example, the vertex lines P1 of the prism structures 313 may be arranged parallel to the Y' axis direction which is rotated by the designated angle θ from the Y axis direction. The designated angle θ may be within about 10 degrees. For another example, the designated angle θ may be within about 2 degrees. Generally, a moiré phenomenon may occur while light delivered from a light source and/or a light guide plate passes through an optical film, and the moiré phenomenon may obstruct vision. A moiré fringe due to a moiré phenomenon, when multiple structures having periodicity overlap in the same direction or in the cross direction to each other, may be defined as a pattern (e.g., a wavy pattern) having a period greater than that before the overlap thereof. The moiré phenomenon may occur even by a pixel of a liquid crystal (LC) panel and a prism pattern. For example, a moiré phenomenon between the light guide plate 130 and the first prism sheet 210 may occur. The optical film 200 according to the disclosure may have an optical axis direction (the X axis direction) and the prism structures 313 of the first prism sheet 210 which are tilted to a designated angle so as to prevent a moiré phenomenon. For another example, a moiré phenomenon may occur by a stack arrangement between prism sheets (e.g., the first prism sheet 210 and the second prism sheet 220). The optical film 200 according to the disclosure may have the first prism sheet 210 and the second prism sheet 220 which are tilted to a designated angle so as to prevent a moiré phenomenon.

Referring again to FIG. 1 to FIG. 4, a second prism sheet (e.g., the second prism sheet 220 of FIG. 1 to FIG. 4) may include the second base film 221 and a second prism pattern layer 222 formed on a surface (an upper surface) of the second base film 221, which faces in the first direction (the +Z). The second base film 221 may be made of transparent polyethylene terephthalate (PET), and the second prism pattern layer 222 may be made of ultraviolet (UV) resin. The second base film 221 may have a plate shape, and the second prism pattern layer 222 may have a structure in which multiple prism structures are arranged along one direction.

According to various embodiments, each of the prism structures of the second prism sheet 220 may have the same equilateral triangular column shape.

Figure 7A:
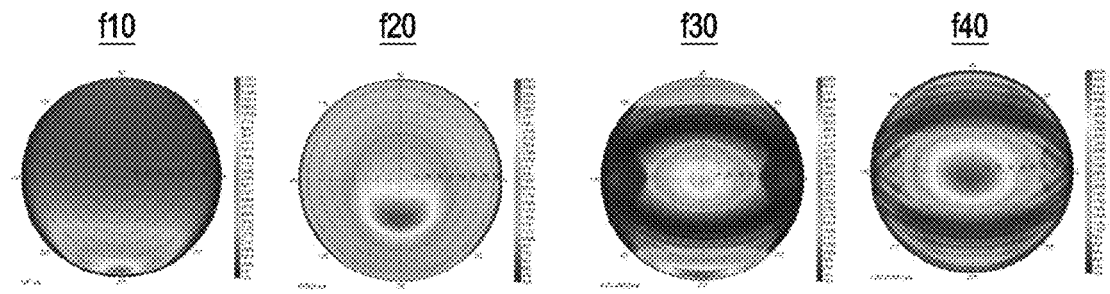
FIG. 7A is an angle distribution map according to luminance of when a general optical film structure is used.
Figure 7B:
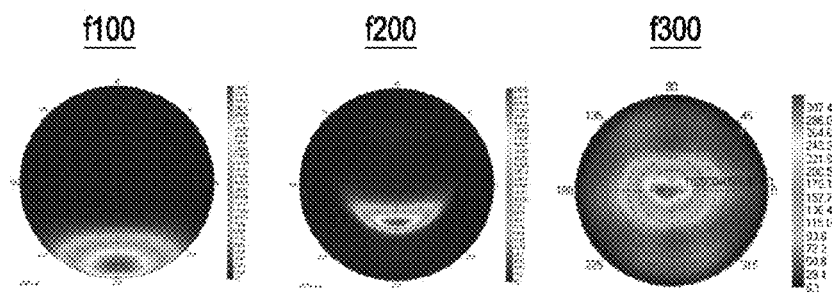
FIG. 7B is an angle distribution map according to luminance of when an optical film structure according to various embodiments of the disclosure is used.

FIG. 7A is an angle distribution map according to luminance of when a general optical film structure is used. FIG. 7B is an angle distribution map according to luminance of when an optical film structure according to various embodiments of the disclosure is used.

A general optical film may have a light guide plate, a diffusion sheet, a first prism sheet, and the second prism sheet which are sequentially stacked and arranged. Referring to FIG. 7A, the 1-1st distribution map f10 may mean an angle distribution of luminance of a light guide plate which has guided the light provided from a light source, the 1-2st distribution map f20 may mean an angle distribution of luminance of a diffusion sheet which has diffused the light delivered from a light guide plate, the 1-3st distribution map f30 may mean an angle distribution of luminance of a first prism sheet which has firstly collected the light delivered from a diffusion sheet, and the 1-4st distribution map f40 may mean an angle distribution of luminance of a second prism sheet which has secondly collected the light delivered from a first prism sheet. In the angle distribution map, the luminance of an optical film may increase as light is more concentrated in the center thereof.

An optical film according to the disclosure may have a light guide plate, a first prism sheet, and the second prism sheet which are sequentially stacked and arranged. An optical film according to the disclosure, differently from a general optical film, may exclude a diffusion sheet between a light guide plate and a first prism sheet. The optical film may have partially or entirely the same structure as the structure of the optical film 200 of FIG. 1 to FIG. 6.

Referring to FIG. 7B, the 2-1st distribution map f100 may mean an angle distribution of luminance of a light guide plate which has guided the light provided from a light source, the 2-2st distribution map f200 may mean an angle distribution of luminance of a first prism sheet which has firstly collected the light delivered from a light guide plate, and the 2-3st distribution map f300 may mean an angle distribution of luminance of a second prism sheet which has secondly collected the light delivered from a first prism sheet.

According to the illustrated embodiment, it can confirm that an optical film of the disclosure has an improved luminance differently from a general optical film. For example, when the 2-2st distribution map f200 is compared with the 1-3st distribution map f30, it can confirm that, in the 2-2st distribution map f200, light is more concentrated in the central vicinity thereof without a distribution of light. For another example, when the 2-3st distribution map f300 is compared with the 1-4st distribution map f40, it can confirm that, in the 2-3st distribution map f300, light is more concentrated in the center thereof.

An optical film and/or a backlight unit according to the disclosure can be slimmed down by removing a diffusion sheet between a light guide plate and a prism sheet. In addition, even though a diffusion sheet is removed, the overall luminance thereof can be improved due to the structure of a first prism sheet and the structure of the second prism sheet and the arrangement relationship between a first prism sheet and a second prism sheet.

FIG. 8A to FIG. 8E illustrate angle distributions in connection with luminance according to the degree of tilting between a first prism sheet and a second prism sheet according to various embodiments of the disclosure with regard to experiment cases, respectively.

According to various embodiments, a backlight unit (e.g., the backlight unit 10 of FIG. 1) may include a light source 110, a light guide plate, a first prism sheet 210, and a second prism sheet 220. The backlight unit 10 according to experimental examples of FIG. 8A to FIG. 8E may have partially or entirely the same structure as the structure of the backlight unit 10 of FIG. 1 to FIG. 6.

According to an experimental example 1 referred to FIG. 8A, the light source 110 may be disposed to extend along the Y axis direction, and the arrangement (e.g., the arrangement of vertex lines) of multiple prism structures constituting the first prism sheet 210 may be arranged to extend parallel to the light source 110 along the Y axis direction. The arrangement (e.g., the arrangement of vertex lines) of multiple prism structures constituting the second prism sheet 220 may be arranged to extend along a direction which is tilted to a designated angle, e.g., about 6.5 degrees, with respect to the arrangement of multiple prism structures constituting the first prism sheet 210.

Referring to an angle distribution map of luminance according to the experimental example 1, it can confirm that the light having passed through the first prism sheet 210 and the second prism sheet 220 is concentrated in the center thereof without a distribution of light. The experimental example 1 may be a reference case, and the luminance thereof may be set as 100%.

According to an experimental example 2 referred to FIG. 8B, the light source 110 may be disposed to extend along the Y axis direction, and the arrangement (e.g., the arrangement of vertex lines) of multiple prism structures constituting the first prism sheet 210 may be arranged to extend parallel to the light source 110 along the Y axis direction. The arrangement (e.g., the arrangement of vertex lines) of multiple prism structures constituting the second prism sheet 220 may be arranged to extend along a direction which is tilted to a designated angle, e.g., about 10 degrees, with respect to the arrangement of multiple prism structures constituting the first prism sheet 210.

Referring to an angle distribution map of luminance according to the experimental example 2, it can confirm that the light having passed through the first prism sheet 210 and the second prism sheet 220 is concentrated in the center thereof but the concentration degree is lower than the experimental example 1. Luminance measured according to the experimental example 2 has a relative value of about 98.6% to the reference experimental example.

According to an experimental example 3 referred to FIG. 8C, the light source 110 may be disposed to extend along the Y axis direction, and the arrangement (e.g., the arrangement of vertex lines) of multiple prism structures constituting the first prism sheet 210 may be arranged to extend parallel to the light source 110 along the Y axis direction. The arrangement (e.g., the arrangement of vertex lines) of multiple prism structures constituting the second prism sheet 220 may be arranged to extend parallel to along the Y axis direction, with respect to the arrangement of multiple prism structures constituting the first prism sheet 210.

Referring to an angle distribution map of luminance according to the experimental example 3, it can confirm that the light having passed through the first prism sheet 210 and the second prism sheet 220 is concentrated in the center thereof without a distribution of light. Luminance measured according to the experimental example 3 has a relative value of about 101.7% to the reference experimental example.

According to an experimental example 4 referred to FIG. 8D, the light source 110 may be disposed to extend along the Y axis direction, and the arrangement (e.g., the arrangement of vertex lines) of multiple prism structures constituting the first prism sheet 210 may be arranged to extend parallel to the light source 110 along the Y axis direction. The arrangement (e.g., the arrangement of vertex lines) of multiple prism structures constituting the second prism sheet 220 may be arranged to extend along a direction which is tilted to a designated angle, e.g., about 45 degrees, with respect to the arrangement of multiple prism structures constituting the first prism sheet 210.

Referring to an angle distribution map of luminance according to the experimental example 4, it can confirm that the light having passed through the first prism sheet 210 and the second prism sheet 220 is concentrated in the center thereof without a distribution of light but the concentration degree is lower than the experimental example 1. Luminance measured according to the experimental example 4 has a relative value of about 60.6% to the reference experimental example.

According to an experimental example 5 referred to FIG. 8E, the light source 110 may be disposed to extend along the Y axis direction, and the arrangement (e.g., the arrangement of vertex lines) of multiple prism structures constituting the first prism sheet 210 may be arranged to extend parallel to the light source 110 along the Y axis direction. The arrangement (e.g., the arrangement of vertex lines) of multiple prism structures constituting the second prism sheet 220 may be arranged to extend along the X axis direction perpendicular to the arrangement of multiple prism structures constituting the first prism sheet 210.

Referring to an angle distribution map of luminance according to the experimental example 5, it can confirm that the light having passed through the first prism sheet 210 and the second prism sheet 220 is concentrated in the center thereof without a distribution of light but the concentration degree is lower than the experimental example 1. Luminance measured according to the experimental example 5 has a relative value of about 30.3% to the reference experimental example.

When examining the illustrated experimental examples, it can confirm that the luminance thereof is improved only in the case where the arrangement of multiple prism structures of the first prism sheet 210 and the arrangement of multiple prism structures of the second prism sheet 220 are tilted to each other by a designated angle. In the case of the experimental example 1 to the experimental example 3, the luminance performance favorable to a backlight unit can be maintained, but in the case of the experimental example 3, a moiré may occur in an LCD panel. Therefore, in the case where the designated angle is within about +15 degrees or about −15 degrees excluding zero degree, for example within about +10 degrees or about −10 degrees, it can confirm a favorable luminance performance.

Figure 9:
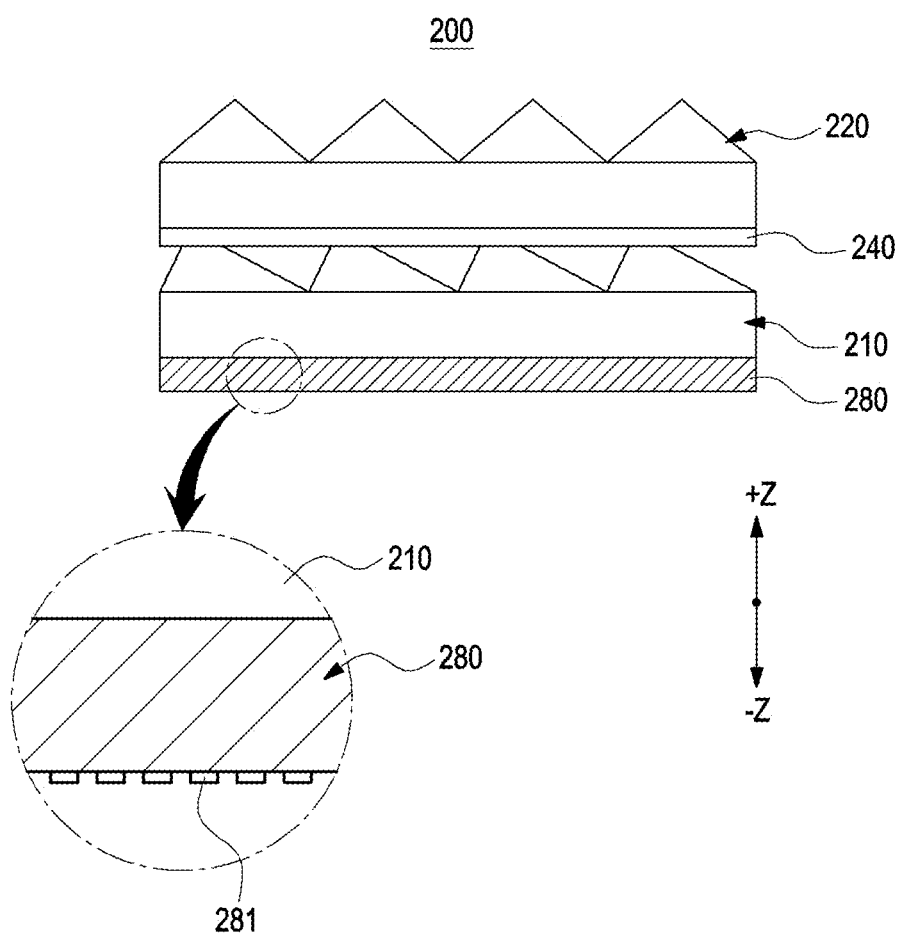
FIG. 9 is a cross-sectional view illustrating a part of a backlight unit according to various embodiments of the disclosure.

FIG. 9 is a cross-sectional view illustrating a part of a backlight unit according to various embodiments of the disclosure.

Referring to FIG. 9, an optical film 200 may be stacked and disposed over a light guide plate (e.g., the light guide plate 130 of FIG. 1), and the optical film 200 may include a first prism sheet 210, a second prism sheet 220, an adhesive layer 240, and an adsorption prevention layer 280. According to an embodiment, the optical film 200 may have the adsorption prevention layer 280, the first prism sheet 210, the adhesive layer 240, and the second prism sheet 220 which are sequentially stacked over the light guide plate 130.

The first prism sheet 210, the second prism sheet 220, and the adhesive layer 240 of FIG. 9 may have partially or entirely the same structure as the structure of the first prism sheet 210, the second prism sheet 220, and the adhesive layer 240 of FIG. 2 and/or FIG. 3.

According to various embodiments, the adhesive prevention layer 280 may be disposed on a lower surface (a surface facing in the −Z axis direction) of the first prism sheet 210. The adhesive prevention layer 280 may have a pattern having multiple protrusions 281 which are formed thereon and configured to face in the −Z axis direction. According to one embodiment, each of the multiple protrusions 281 may have a hemispherical structure or a cylindrical structure and may have a height of about 5-10 μm. According to another embodiment, the multiple protrusions may be configured to be spaced apart from each other, and for example, the multiple protrusions 281 may have a fill factor of about 3-10% with reference to one surface of the adsorption prevention layer 280. For another example, the fill factor may be about 5%.

According to various embodiments, the adsorption prevention layer 280 may be made of ultraviolet (UV) resin, and may be formed to have a value less than or equal to haze 5%. For example, the adsorption prevention layer 280 may be a layer for preventing the adsorption between the first prism sheet 210 and a light guide plate (e.g., the light guide plate 130 of FIG. 1), and may be implemented to have a minimum haze value for preventing the adsorption. In addition, the adsorption prevention layer 280, in order to improve luminance performance, may be implemented to have a value less than or equal to a predetermined haze value. Referring to the below [Table 1], it can confirm the luminance and an adsorption state according to a haze value of the adsorption prevention layer 280.

TABLE 1

| Haze of pattern of adsorption prevention layer | 0% | Greater than 1%, 5% or less | Greater than 5%, 10% or less | Greater than 10%, 15% or less |
|---|---|---|---|---|
| Luminance | 100% | Less than 100%, 96% or more | Less than 96%, 92% or more | Less than 92%, 90% or more |
| Whether light guide plate is adsorbed | No absorption | No absorption | No absorption | No absorption |

According to the disclosure, in the case where the adsorption prevention layer 280 is disposed to be in contact with the light guide plate 130, the adsorption therebetween can be prevented, and accordingly transmittance of light delivered from the light guide plate 130 to the optical film 200 can be improved and luminance can be improved.

A backlight unit (e.g., 10 of FIG. 1) according to various embodiments of the disclosure may include a light source (e.g., 110 of FIG. 1), a light guide plate (e.g., 130 of FIG. 1) configured to guide light emitted from the light source and disposed to face in a first direction, and an optical film (e.g., 200 of FIG. 2) disposed over the light guide plate. The optical film may include a first prism sheet (e.g., 210 of FIG. 2) including first prism structures (e.g., 213 of FIG. 2) arranged side by side to each other along a second direction perpendicular to the first direction, and a second prism sheet (e.g., 220 of FIG. 2) disposed over the first prism sheet and including second prism structures (e.g., 223 of FIG. 2) which are arranged side by side to each other along a third direction forming an acute angle with the second direction.

According to various embodiments, the optical film may further include an adhesive layer (e.g., 240 of FIG. 3) disposed between the first prism sheet and the second prism sheet to bond the first prism sheet and the second prism sheet to each other.

According to various embodiments, the optical film may have a lower surface disposed to be in contact with the light guide plate.

According to various embodiments, with respect to one vertex line among the first prism structures facing in the second direction, one vertex line among the second prism structures facing in the third direction may have an angle within 15 degrees.

According to various embodiments, each of the first prism structures of the first prism sheet may have an asymmetric triangular column shape, and each of the second prism structures of the second prism sheet may have an equilateral triangular column shape.

According to various embodiments, in one first prism structure of the first prism structures, the length of one surface disposed parallel to the light guide plate may be defined as a first side, the length of one surface which forms a designated first angle with the first side and is inclined may be defined as a second side, and the length of one surface which forms a designated second angle with the first side and is inclined may be defined as a third side. The light source may be disposed adjacent to the second side of a first prism structure, which is positioned at an edge, among the multiple of the first prism structures.

According to various embodiments, an angle formed by the second side and the third side may be defined as a third angle, and each of the first angle, the second angle, and the third angle may have an acute angle less than 90 degrees.

According to various embodiments, among the first side, the second side, and the third side, the first side may have the longest length, and among the first angle, the second angle, and the third angle, the third angle may have the largest value.

According to various embodiments, a surface including the third side formed by the second angle of each of the prism structures may be configured to collect light delivered through the light guide plate so as to form a light-emitting surface for emitting the collected light to the second prism sheet.

According to various embodiments, the first prism sheet may include a first base film and a first prism pattern layer which is disposed on an upper surface of the first base film and on which the multiple first prism structures are arranged, the first base film may include a light-transmitting material, and the first prism pattern layer may include a resin.

According to various embodiments, a vertex line of each of the first prism structures of the first prism sheet may be configured to extend in a direction parallel to a length direction of the light source.

According to various embodiments, a vertex line of each of the first prism structures of the first prism sheet may be configured to be tilted with respect to a length direction of the light source by a designated angle and extend, and the designated angle may be configured to be within 10 degrees.

According to various embodiments, the optical film may further include a diffusion sheet (e.g., 250 of FIG. 4) which is disposed on an upper surface of the second prism sheet and configured to uniformly diffuse light collected by the first prism sheet and the second prism sheet.

According to various embodiments, the optical film may further include an adsorption prevention layer (e.g., 280 of FIG. 9) which is disposed on a lower surface of the first prism sheet and configured to prevent adsorption between the first prism sheet and the light guide plate.

According to various embodiments, the adsorption prevention layer may include multiple protrusions configured to protrude toward the light guide plate, and the multiple protrusions each may have a height of 5-10 μm.

It will be obvious to those skilled in the art that the optical film and the backlight unit including same according to various embodiments of the disclosure described above is not limited to these embodiments and drawings described above, and various replacements, changes, and modifications may be made therein without departing from the disclosure as defined by the appended claims.

What is claimed is:

1. A backlight unit comprising:
a light source;
a light guide plate configured to guide light emitted from the light source and disposed to face in a first direction; and
an optical film disposed over the light guide plate, wherein
the optical film comprises:
a first prism sheet comprising first prism structures arranged side by side to each other along a second direction perpendicular to the first direction; and
a second prism sheet disposed over the first prism sheet and comprising second prism structures arranged side by side to each other along a third direction forming an acute angle with the second direction,
wherein each of the first prism structures of the first prism sheet has an asymmetric triangular column shape, and each of the second prism structures of the second prism sheet has an equilateral triangular column shape.

2. The backlight unit of claim 1, wherein the optical film further comprises an adhesive layer disposed between the first prism sheet and the second prism sheet to bond the first prism sheet and the second prism sheet to each other.

3. The backlight unit of claim 1, wherein a lower surface of the optical film is disposed to be in contact with the light guide plate.

4. The backlight unit of claim 3, wherein a top edge of the first prism structures facing in the second direction and a top edge of the second prism structures facing in the third direction make an angle not greater than 15 degrees.

5. The backlight unit of claim 1, wherein, in one first prism structure of the first prism structures, the length of one surface disposed parallel to the light guide plate is defined as a first side, the length of one surface which forms a designated first angle with the first side and is inclined is defined as a second side, and the length of one surface which forms a designated second angle with the first side and is inclined is defined as a third side,
the light source is disposed adjacent to the second side of the first prism structure, which is positioned at an edge, among the first prism structures.

6. The backlight unit of claim 5, wherein when an angle formed by the second side and the third side is defined as a third angle,
each of the first angle, the second angle, and the third angle has an acute angle less than 90 degrees.

7. The backlight unit of claim 6, wherein, among the first side, the second side, and the third side, the first side has the longest length, and,
among the first angle, the second angle, and the third angle, the third angle has the largest value.

8. The backlight unit of claim 5, wherein a surface including the third side formed by the second angle of each of the prism structures is configured to collect light delivered through the light guide plate so as to form a light-emitting surface for emitting the collected light to the second prism sheet.

9. The backlight unit of claim 1, wherein the first prism sheet comprises a first base film and a first prism pattern layer which is disposed on an upper surface of the first base film and on which the multiple first prism structures are arranged, the first base film comprises a light-transmitting material, and the first prism pattern layer comprises a resin.

10. The backlight unit of claim 3, wherein a vertex line of each of the first prism structures of the first prism sheet is configured to extend in a direction parallel to a length direction of the light source.

11. The backlight unit of claim 3, wherein a vertex line of each of the first prism structures of the first prism sheet is configured to be tilted with respect to a length direction of the light source by a designated angle and extend, and the designated angle is configured to be not greater than 10 degrees.

12. The backlight unit of claim 1, wherein the optical film further comprises a diffusion sheet disposed on an upper surface of the second prism sheet and configured to uniformly diffuse light collected by the first prism sheet and the second prism sheet.

13. The backlight unit of claim 1, wherein the optical film further comprises an adsorption prevention layer disposed on a lower surface of the first prism sheet and configured to prevent adsorption between the first prism sheet and the light guide plate.

14. The backlight unit of claim 13, wherein the adsorption prevention layer comprises multiple protrusions configured to protrude toward the light guide plate, and the multiple protrusions each are configured to have a height of 5-10 μm.

* * * * *